Feb. 7, 1961   M. C. EDLUND   2,970,932
PAPERBOARD HAVING A WATER-REPELLENT COATING
Filed May 19, 1958
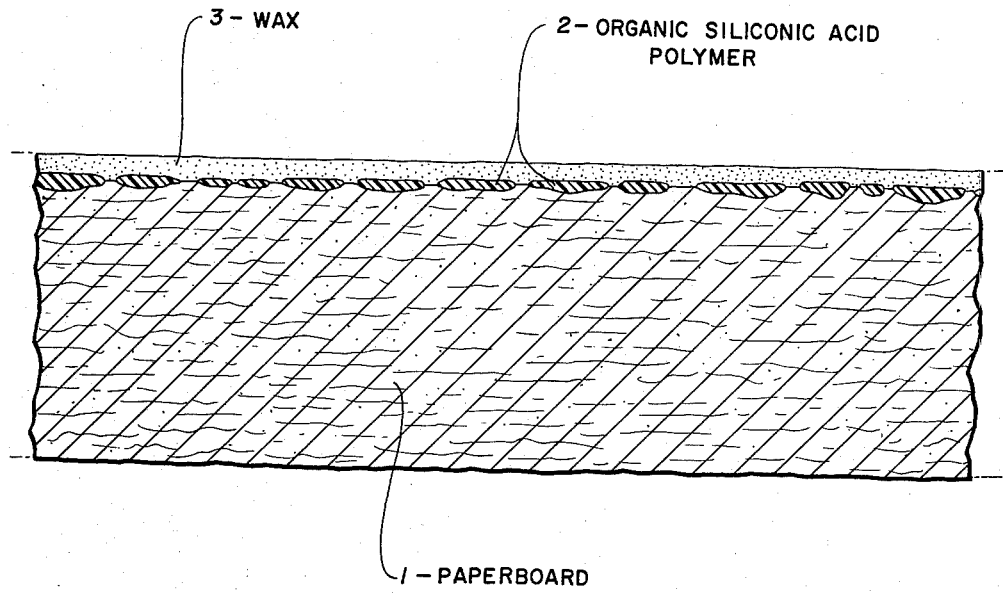
*INVENTOR.*
MELVIN C EDLUND
BY
*Attorneys*

United States Patent Office 2,970,932
Patented Feb. 7, 1961

2,970,932

PAPERBOARD HAVING A WATER-REPELLENT COATING

Melvin C. Edlund, North Sacramento, Calif., assignor to Fibreboard Paper Products Corporation, San Francisco, Calif., a corporation of Delaware Filed May 19, 1958, Ser. No. 735,979

2 Claims. (Cl. 117—45)

This invention relates to a water-repellent silicone coating for porous materials, and more particularly to the use of a polymer of organic siliconic acid for increasing the resistance of paperboard or the like to penetration by water.

Silicone oils and silicone resins of various types have been extensively employed for rendering surfaces water repellent. However, the silicone coatings heretofore employed either damage or do not adequately waterproof porous materials, such as paper, cotton, wool, and leather. For example, aqueous solutions of sodium alkyl siliconates have been particularly useful for waterproofing masonry surfaces, but they turn paper products brown. Furthermore, the silicone coatings generally used for waterproofing repel most decorative and protective surface coatings commonly applied to porous materials, such as the wax compositions used on paperboard. Consequently, such silicones cannot be employed in conjunction with such protective or decorative coatings.

An object of this invention is the provision of a water repellent composition and method that does not prevent formation of another protective and decorative coating on top of a water-repellent coating.

Another object of this invention is to provide an extremely water-repellent surface for paperboard containers for liquids.

Other objects will become apparent from a reading of the following description.

To summarize this invention, the foregoing objects are obtained by acidifying a water soluble organic siliconate that has a single organic radical attached to the silicon atom. This acidification of the organic siliconate produces siliconic acid which automatically polymerizes to provide a gel. A stable emulsion of siliconic acid polymer is then provided by mixing the gel with a volatile liquid carrier, preferably water, and agitating the mixture. Finally, the emulsion of the polymerized organic siliconic acid is applied to the surface to be protected, and the volatile liquid carrier evaporates leaving a deposit of particles of the siliconic acid polymer on the surface of the material. A water soluble adhesive binder, such as starch, is advantageously included in the slurry to increase adherence of the siliconic acid polymeric particles to the surface of the material.

The resultant coating imparts substantial water-resistant properties when it is used alone on the surface of the material. However, a further most surprising increase in water-resistant properties is obtained by utilizing the organic siliconic acid gel as a size, and applying a top coating of another protective material, such as wax. This result is particularly important in view of the increasing use of paperboard containers for liquids.

The usual wax coatings, such as those applied to milk cartons appear to be smooth and continuous. However, such coatings contain minute cracks, and over a period of time the liquid tends to penetrate through the cracks into the paperboard. When the wax coating is employed alone without an initial size coating of the organic siliconic acid polymer hereof, the water enters the paperboard and causes swelling. As the moistened paperboard expands, the cracks in the wax are increased in size and number and the liquid penetrates more rapidly into the paperboard. Finally, the moisture causes the paperboard to lose its strength, and rectangular paperboard cartons that contain liquids tend to adopt a barrel-like shape upon standing for a period of time.

However, if the emulsion of organic siliconic acid polymer is applied to paperboard before application of wax coating, the particles of polymerized organic siliconic acid tend to lodge in the pores of the paperboard without covering the ridges and mounds on the board with the siliconic acid polymer. A wax coating may then readily be applied, and it adheres to the uncovered areas on the paperboard. The siliconic acid gel in the pores increases the contact angle of water with the paperboard to such an extent that water attempting to enter minute cracks in the wax is repelled. As a result, the combined coating of organic siliconic acid polymer generally employed since they are more soluble in water and a paperboard container for liquids that has both coatings retains its shape for long periods of time.

The drawing illustrates paperboard 1, a discontinuous coating of siliconic acid polymer 2 on the paperboard, and a coating of wax 3 overlying the discontinuous coating of siliconic polymer.

In greater detail, any water soluble organic siliconate that has a single organic radical attached to the silicon atom may be acidified to form a gel of siliconic acid polymer in accordance with this invention. Such siliconates may be represented by the formula $R-Si(OM)_3$. The R is an alkyl or aryl, saturated or unsaturated, organic radical of any size provided that the radical is not so long that it renders the siliconate insoluble in basic aqueous solutions. Examples of such organic radicals are phenyl, tolyl, methyl, ethyl, butyl and propyl. Generally, siliconates having organic radicals that contain from one to about seventeen carbon atoms are water soluble, and they may be utilized to form the water-repellent siliconic acid polymer. Particularly good results are obtained when the R is a short chain alkyl group, such as $CH_3$, $C_2H_5$ and $C_3H_7$.

In the above formula the Si represents silicon, the O is oxygen, and the M is a cation. Siliconates that have alkali metal cations, such as sodium and potassium, are generally employed since they are more soluble in water than siliconates that have other cations. Thus it is apparent that the only requirement is that the siliconate be water soluble, and have one organic radical and three (OM) groups attached to the silicon atom. In other words water soluble siliconates that are trifunctional are employed in accordance with this invention.

It is not necessary that the siliconate compositions be composed entirely of a siliconate that has only one organic radical per silicon atom. Mixtures of water soluble siliconates are also useful in the preparation of the water repellent polymer hereof. These mixtures may be composed primarily of organic siliconates that have more than one organic radical attached to the silicon atom, as long as the mixture contains a trifunctional water soluble organic siliconate that has a single organic radical attached to the silicon atom.

Trifunctional siliconates having three (OM) groups provide the linkages that result in formation of a three dimensional polymeric gel, and the rigidity of the gel increases as the proportional amount of the trifunctional siliconate is increased. Consequently, mixtures of siliconates should have at least about 1.0 percent by weight of such trifunctional siliconate based on the total weight of siliconate present, and preferably between 10 and 100 percent by weight of the trifunctional siliconate. Thus, similar to the case of synthetic resin cross-linking agents, it is clear that minor amounts of the trifunctional siliconate are effective in providing a three dimensional gel. Rigid gels containing high proportions of three dimensional siliconates are preferred since particles of such gels provide a higher degree of water repellency in the final coating. For example, a stable emulsion and an excellent water resistant coating is formed by acidifying a solution of the sodium salts of methyl siliconic acids in aqueous sodium hydroxide. The solution has a pH of about 13 and it is composed of more than 50 percent by weight $CH_3Si(ONa)_3$, or in other words sodium monomethyl siliconate, with $(CH_3)_2Si(ONa)_2$ or sodium dimethyl siliconate, and a small amount of $(CH_3)_3SiONa$ or sodium trimethyl siliconate present.

The alkali metal organic siliconate is converted into the corresponding siliconic acid by adding an acid to the basic solution of the siliconate. Any acid or acidic salt may be employed that provides a water solution having a pH of 10 or less. Best results are obtained with strong acids, such as hydrochloric, sulfuric and nitric acids because only a small amount of such acids are required. Weak acids, such as carbonic, acetic, citric and boric acids are not as satisfactory as strong acids because an excess of weak acid is required to maintain a suitable pH due to the buffering effect obtained when the salt of the weak acid builds up in the aqueous mixture. Furthermore, the gel obtained with strong acids is firmer and provides greater water-repellent properties to the final coating than the softer gel obtained with weak acids. Acidic salts that hydrolyze in aqueous solution to provide an acid pH may also be employed to convert the siliconate to siliconic acid. The aluminum salts of hydrochloric, acetic, and nitric acids are examples of such acidic salts.

Acid is added to the basic solution of alkali metal organic siliconate until the siliconate is converted into the corresponding siliconic acid. The siliconic acid rapidly polymerizes without addition of a catalyst to form a gel, and the formation of a gel may be used as a visual end point for the formation of siliconic acid. Also, pH measurements may be utilized to determine when sufficient acid has been added to the basic solution to form siliconic acid, since the siliconic acid forms at a pH of about 10 or lower. At a pH above about 10, the siliconate remains as a salt and no gel is formed. If the pH is reduced to below about 7, the gel is not as firm as the one obtained at a pH between about 10 and 7. Furthermore, gels that are strongly acid may damage the porous material, such as paper, to which the siliconic acid polymer is applied. However, the siliconic acid may be utilized at any pH below 10 although pH's below 7 do not provide optimum results. When the gel to be utilized is for treating paper products, it is preferably acidified to a pH of about 8 to prevent the paper from turning brown due to the high pH.

In order to provide a firm but resilient gel of siliconic acid that produces an excellent water resistant coating composition, the acid is most advantageously added to the basic siliconate solution rapidly with agitation until a pH of between about 10 and 7 is obtained. Within a short period after addition of the acid a gel of siliconic acid polymer is formed. The solution of siliconate should preferably contain more than about one percent by weight alkali metal organic siliconate. If more dilute solutions of siliconates are acidified, a soft gel is formed which does not provide as satisfactory water repellent properties as a firm gel. Suitable gels have been consistently formed with from about 1 to 9 percent by weight of silicone solids in basic solution, and much more concentrated solutions may also be utilized.

Aqueous emulsions or slurries of the organic siliconic acid polymer are readily prepared by beating the gel with water, preferably in a high speed mechanical mixer. The amount of water employed to form the emulsion with the gel is not particularly critical. It is only desirable to add sufficient water to obtain an emulsion or slurry that is neither too viscous to be readily applied to a surface, nor is so thin that the effectiveness of the coating as a water repellent composition is reduced when it is applied to porous materials. Emulsions that contain more than about 2½ percent by weight of silicone solids are most suitable for application as a coating, although lower amounts of silicone can be used. The upper limit of the amount of silicone solids in the emulsion is only restricted by the difficulty in applying very viscous coatings, and coatings that have a viscosity above 10,000 centipoises are generally too viscous to be handled on conventional equipment.

In the emulsions formed by mixing the gel with water the water is present as the continuous phase. Such emulsions are extremely stable and exhibit thixotropic properties. With a slurry having an original viscosity of about 960 cps., the viscosity gradually drops off during a period of about one month to about 450 cps.

In order to enable the particles of siliconic acid polymer to adhere more strongly to the porous material to which they are applied, a water soluble adhesive gum is preferably incorporated in the emulsion. Any suitable well-known water soluble adhesive gum-like binder may be employed, such as starch, polyvinyl alcohol, carboxymethylcellulose salts, kelgin and dextrin.

The weight ratio of adhesive gum binder to siliconic acid solids in the emulsion should be between about 8 to 160 parts by weight binder per one hundred parts by weight of the siliconic acid solids in the emulsion. If smaller ratios of adhesive binder are employed, the binder does not appreciably increase adherence of the gel particles to the porous material. However, if more than about 160 parts by weight of binder per 100 parts by weight siliconic acid is employed, the large amount of binder tends to reduce the water-repellent character of the mixture. The binder may be added to the solution of organic siliconate before it is acidified to form a gel, or it may be added to the mixture of siliconic acid during or after formation of the emulsion.

After the emulsion has been formed, it may be applied to porous materials, such as paperboard, by any conventional means. For example, the usual roll coating method, or a knife coater may be employed to spread the siliconic acid emulsion over the surface of the porous material. Best results in providing a substantial increase in resistance of the surface to penetration by water are obtained by using from 0.03 pound to 0.5 pound of silicone solids per thousand square feet of treated surface. Any amount of the emulsion can be applied without harming the resulting coating. However, very little additional increase in water resistance is obtained by employing more than about 0.5 pound of silicone solids per thousand square feet of treated surface. Almost any porous material, such as leather, or wool and cotton fabrics may be treated with the water-proofing emulsion hereof. However, the emulsion is particularly useful for waterproofing paper products, such as paperboard. The emulsion is applied to the side of the porous material that is to be closest to the moisture.

When the emulsion has been applied to the treated surface, the water evaporates and leaves a deposit of particles of siliconic acid polymer. The particles of polymer are distributed on the coating in a discontinuous fashion and they tend to lodge in the pores of the coated paperboard. The adhesive gum in the composition helps to hold the particles to the board.

Since the particles of siliconic acid do not form a continuous film, the portion of the board that is not covered with siliconic acid provides a surface to which other coating materials can adhere. For example, a board coated with particles of siliconic acid in accordance with this invention can be waxed or glued, whereas most continuous water repellent silicone coatings prevent other compositions, such as wax or glue from adhering to the board. Water is repelled by the particles of siliconic acid even though the coating is discontinuous, because of the high contact angle of water with the silicone particles. Consequently, the discontinuous siliconic acid coating has entirely different properties than previous silicone coatings.

Although the siliconic acid polymer provides appreciable water resistance to the coated surface, a surprisingly great increase in water-repellency is obtained by applying a wax coating on top of the coating of the siliconic polymer. Application of a heavy wax film on the surface material treated with the emulsion of siliconic acid polymer markedly increases the resistance of the coatings to penetration by water, whereas a light wax film shows a moderate improvement. Consequently, fairly heavy wax coatings are employed when superior water resistance is desired. Such coatings advantageously contain from about 3 to 9 pounds of wax per thousand square feet of board surface. Any of the usual commercial paraffine wax or modified wax compositions may be employed as the top coating, and they may be applied by any conventional waxing means.

As an example of the preparation and use of a coating of an organic siliconic acid polymer, paperboard of the type commonly utilized for milk cartons was impregnated with an emulsion of the polymer. The emulsion was prepared by adding 4 ml. of concentrated 38 percent hydrochloric acid to 100 ml. of a 25 percent solids solution of siliconate having a pH of about 13 and containing about 70 percent based on the total weight of siliconate of mono-methyl siliconate with the remainder being dimethyl and trimethyl siliconate. The hydrochloric acid was added rapidly with agitation until the solution had a pH of about 10. Within less than a minute, a thick resilient gel of siliconic acid polymer had formed.

The siliconic acid gel was then vigorously beaten with a high speed mechanical mixer and 100 ml. of an aqueous solution containing three percent by weight of starch was added to the gel. The starch serves as an adhesive gum to help the gel adhere to the paperboard. Agitation was continued for about 15 minutes, and a stable emulsion in the form of a slurry was obtained. The emulsion had a viscosity of 960 cps. after preparation.

In order to prevent discoloration of the paperboard because of the high pH, additional hydrochloric acid was added to bring the pH of the emulsion to about 8 since paperboard assumes a very light brownish color when the emulsion is employed at a pH of 10. The emulsion was then applied to bleached kraft milk carton board with a roll applicator, and the amount of coating was adjusted to provide about 0.5 pound of silicone solids per square foot of board surface. The water evaporated leaving particles of siliconic acid polymer on the board. When a portion of the coated board was stained with sliver nitrate, the siliconic acid polymer appeared as white specks on the surface.

Another portion of the siliconic acid polymer treated board, and a section of the same milk carton board not previously coated with the siliconic acid polymer were cut and scored to form milk carton blanks. The blanks were then waxed by passing the board through a bath of molten wax, and chilling the board with cold air to solidify the wax coating. This treatment provided both sides of each board with a surface coating of about 8 pounds of wax per thousand square feet of board surface, and a total of 35 pounds of wax per thousand square feet of board including the wax on both sides and the wax that penetrated the board. Milk cartons containing milk and made from the paperboard treated with the emulsion and coated with wax did not bulge or lose their shapes in two weeks of storage at 40° F.

Penescope tests with 20 percent by weight lactic acid showed a penetration time of from 80 to 110 minutes for the plain waxed paperboard. On the other hand the waxed siliconic acid polymer coated board had only minor penetration by the 20 percent lactic acid in from 52 hours to 45 days. This vividly illustrates the effectiveness of the coating hereof for waterproofing waxed paperboard. The penescope tests were conducted by mixing the lactic acid with a water soluble dye, namely crocin scarlet, and measuring the time for the initial appearance of red to penetrate to one side of the board when the other side was in contact with the aqueous mixture of lactic acid and dye. The lactic acid was used to provide conditions similar to an accelerated exposure to milk.

I claim:

1. A water-repellent paperboard product comprising paperboard, a discontinuous coating on said paperboard of organic siliconic acid polymer particles derived primarily from an organic siliconic acid that has a single organic radical attached to the silicon atom, and a substantially continuous coating of wax overlying said discontinuous coating of organic siliconic acid polymer particles.

2. A water-repellent paperboard container blank comprising a paperboard blank, a coating on said paperboard blank of discontinuous organic siliconic acid polymer particles derived primarily from an organic siliconic acid that has a single organic radical attached to the silicon atom, said polymer being present on said paperboard in an amount sufficient to provide at least 0.03 pound of silicone solids per one thousand square feet of paperboard coated with said polymer particles, a hydrophilic adhesive gum binder in contact with said paperboard and said polymer particles, and a substantially continuous coating of wax overlying said coating of discontinuous organic siliconic acid polymer particles and said hydrophilic adhesive bum binder.

References Cited in the file of this patent

UNITED STATES PATENTS

| | | |
|---|---|---|
| 2,408,656 | Kirk | Oct. 1, 1946 |
| 2,441,422 | Krieble | May 11, 1948 |
| 2,441,423 | Elliott | May 11, 1948 |
| 2,601,291 | Horning | June 24, 1952 |
| 2,707,157 | Stanton et al. | Apr. 26, 1955 |
| 2,713,545 | Kather | July 19, 1955 |
| 2,768,906 | Jones | Oct. 30, 1956 |
| 2,833,661 | Iler | May 6, 1958 |

UNITED STATES PATENT OFFICE
CERTIFICATION OF CORRECTION

Patent No. 2,970,932          February 7, 1961

Melvin C. Edlund

It is hereby certified that error appears in the above numbered patent requiring correction and that the said Letters Patent should read as corrected below.

Column 2, line 21, strike out "generally employed since they are more soluble in water" and insert instead -- and wax has a great resistance to penetration by water, --; column 5, line 56, for "sliver" read -- silver --; column 6, line 49, for "bum" read -- gum --.

Signed and sealed this 20th day of June 1961.

(SEAL)
Attest:

ERNEST W. SWIDER
Attesting Officer

DAVID L. LADD
Commissioner of Patents